UNITED STATES PATENT OFFICE.

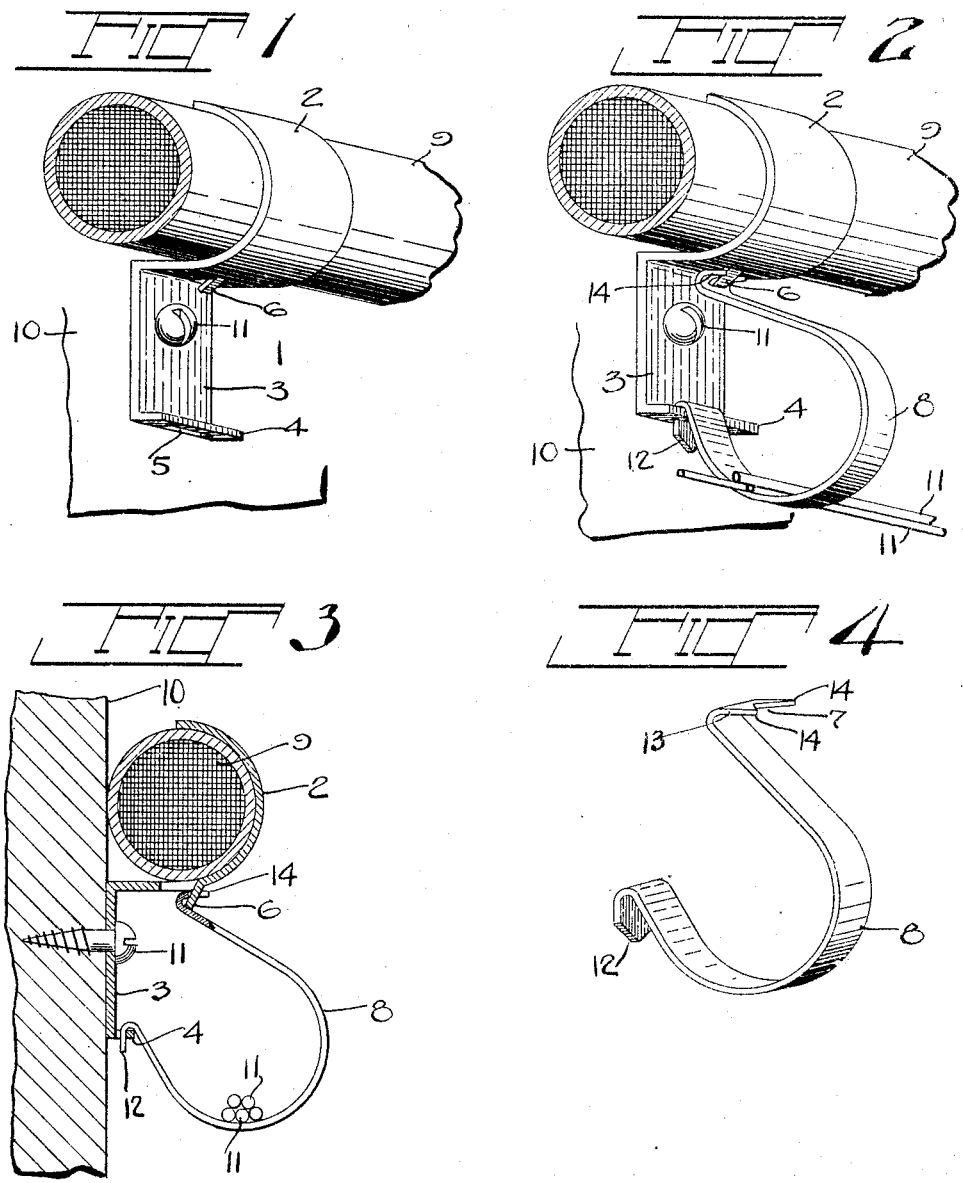

DANIEL R. SHERWOOD, OF PLAINFIELD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,065.  Specification of Letters Patent.  Patented Jan. 11, 1921.

Application filed January 23, 1920. Serial No. 353,622.

*To all whom it may concern:*

Be it known that I, DANIEL R. SHERWOOD, a citizen of the United States, residing at Plainfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a socket or recess to receive one end of a flat bridle ring, and also provided with a tooth to engage with and lock the other end of the bridle ring.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit or cable clamp and of a cable which it supports;

Fig. 2 is a perspective view of the conduit or cable clamp shown in Fig. 1 with the addition of a bridle ring formed from flat sheet metal;

Fig. 3 is a vertical section through the conduit and cable clamp shown in Fig. 2;

Fig. 4 is a perspective view of one form of bridle ring which I preferably employ.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily, my conduit or cable clamp is formed of pressed sheet metal. Preferably I form the base 3 with a flange 4 having a socket or recess 5. When the clamp is formed of pressed sheet material this flange is formed by bending out the lower end of the base 3 as shown in Fig. 1.

On a portion of the clamp I form a tooth 6 to engage with a socket 7 in a bridle ring 8.

The cable 9 is supported on the wall or other suitable support 10 by the screw 11 which may be screwed into said wall before attaching the bridle ring 8.

Whenever it becomes necessary to increase the capacity of the installation by stringing bridle wires 11, 11 this can be easily done by hooking the hook 12 of the bridle ring into the socket 5 and then springing the end 13 of the spring bridle ring so that the tooth 6 will be received in the socket 7 formed by the prongs 14, 14 in the end of the bridle ring which will securely and immovably hold the bridle ring and clamp together.

This tooth 6, when the clamp 1 is made out of pressed material, is preferably formed by being struck up from the surface of the clamp.

Should it ever be desirable to remove the bridle wires 11, 11 and the bridle ring 8 this can be easily done by compressing the spring bridle ring 8 to disengage the socket 7 from the tooth 6 which will then permit the hook 12 to be withdrawn from the socket or recess 5.

In my invention the conduit or cable clamp 1 is positioned without interference of the bridle ring; no tapping or screw-threading of the conduit or cable clamp is required; nor is it necessary to place screw threads upon my bridle ring. This bridle ring is preferably cut from flat spring sheet metal and when in position completely, with the base of the clamp, surrounds the bridle wires so that they cannot possibly work out of the bridle ring. In my construction there is great saving in cost of manufacture as well as a saving of the amount of metal necessary to make the conduit or cable clamp.

Having thus described this invention in connection with illustrative embodiments thereof, to the details of which I do not desire to be limited, what is claimed as new and what is desired to secure by Letters Patent is set forth in the appended claims.

What I claim is:—

1. A conduit or cable clamp provided with a socket or recess to receive one end of a bridle ring, and with a tooth to coöperate with the other end of the bridle ring.

2. The combination in a conduit or cable clamp having a base and a hook portion, the base being provided with a socket or recess to receive one end of a bridle ring, a tooth mounted on the clamp, and a bridle ring having a hook to coöperate with the socket or recess formed in the base, and a socket at its other end to coöperate with the tooth on the clamp.

3. The combination in a conduit or cable clamp formed out of pressed sheet metal having a base and a hook portion, the base being provided with a slotted flange and the clamp being provided with an integral tooth, and a flat spring bridle ring having one end bent back on itself to form a hook, the other end of the bridle ring being provided with prongs between which the tooth of the clamp is securely held.

4. A new article of manufacture comprising a bridle ring to coöperate with a conduit or cable clamp, said bridle ring being formed out of flat sheet spring metal having one end bent back on itself to form a hook the other end provided with a recess, the hook end and the end having the recess adapted to coöperate with coöperating surfaces on a conduit or cable clamp.

5. A new article of manufacture comprising a bridle ring to coöperate with a conduit or cable clamp, said bridle ring being formed out of flat sheet spring metal having one end bent back on itself to form a hook the other end provided with prongs, the hook end and the end having the prongs adapted to coöperate with coöperating surfaces on a conduit or cable clamp.

DANIEL R. SHERWOOD.

Witnesses:
F. W. KERITZKY,
W. A. HESSLER.